United States Patent
Fang et al.

(10) Patent No.: US 9,202,052 B1
(45) Date of Patent: Dec. 1, 2015

(54) DYNAMIC GRAPH ANOMALY DETECTION FRAMEWORK AND SCALABLE SYSTEM ARCHITECTURE

(71) Applicant: EMC Corporation, Hopkinton, MA (US)

(72) Inventors: ChunSheng Fang, San Mateo, CA (US); Derek Lin, San Mateo, CA (US); Teng Wang, Davis, CA (US)

(73) Assignee: EMC Corporation, Hopkinton, MA (US)

( * ) Notice: Subject to any disclaimer, the term of this patent is extended or adjusted under 35 U.S.C. 154(b) by 203 days.

(21) Appl. No.: 14/038,514

(22) Filed: Sep. 26, 2013

Related U.S. Application Data

(60) Provisional application No. 61/838,104, filed on Jun. 21, 2013.

(51) Int. Cl.
G06F 21/00 (2013.01)
G06F 21/56 (2013.01)
H04L 29/06 (2006.01)

(52) U.S. Cl.
CPC .............. *G06F 21/56* (2013.01); *H04L 63/14* (2013.01)

(58) Field of Classification Search
CPC . H04L 63/14; H04L 63/1408; H04L 63/1416; H04L 63/1425; G06F 21/56
See application file for complete search history.

(56) References Cited

U.S. PATENT DOCUMENTS

2008/0270363 A1* 10/2008 Hunt et al. .................... 707/3

OTHER PUBLICATIONS

Zhengzhang Chen, Community-based anomaly detection in evolutionary networks, Oct. 19, 2011,J Intell Inf Syst DOI 10.1007/s10844-011-0183-2.*
Leman Akoglu, Anomaly Detection in Large Graphs, Nov. 2009, Carnegic McIlon University, CMU-CS-09-173.*
Noble et al.,"Graph-based anomaly detection." Proceedings of the ninth ACM SIGKDD international conference on Knowledge discovery and data mining, ACM, 2003.
Chen et al., "Community-based anomaly detection in evolutionary networks." Journal of Intelligent Information Systems 39.1, 2012, pp. 59-85.
Chen et al., "Discovery of extreme events-related communities in contrasting groups of physical system networks." Data Mining and Knowledge Discovery, 2012, pp. 1-34.
Moonesinghe et al., "Outlier detection using random walks." Tools with Artificial Intelligence, 2006, ICTAI'06. 18th IEEE International Conference on. IEEE, 2006.
Mark E. J. Newman, "The structure and function of complex networks.", SIAM review 45.2, pp. 167-256.

(Continued)

*Primary Examiner* — Brandon Hoffman
*Assistant Examiner* — Thong Truong
(74) *Attorney, Agent, or Firm* — Van Pelt, Yi & James LLP

(57) ABSTRACT

Machine generated event log data which includes event(s) occurring over a window of time is received where each event includes one or more events having a first node, a second node, and a timestamp. The events are aggregated into a plurality of aggregated graph snapshots. One or more communities are identified within the plurality of aggregated graph snapshots. One or more community tracking links are determined between communities in the plurality of aggregated graph snapshots. Communities in the plurality of aggregated graph snapshot which are anomalous are identified based on one or more of the following: a community level anomaly or an evolutionary path level anomaly.

24 Claims, 15 Drawing Sheets

(56) References Cited

OTHER PUBLICATIONS

Steinhaeuser et al., "Complex networks as a unified framework for descriptive analysis and predictive modeling in climate science.", Statistical Analysis and Data Mining 4.5, 2011, pp. 497-511.

Greene et al., "Tracking the Evolution of Communities in Dynamic Social Networks" International Conference on Advances in Social Networks Analysis and Mining, 2010.

Fang et al., "Framework for Link Prediction and Vertex Behavior Modeling in Social Networks via Graph Embedding", ACM SIG KDD, SNA workshop, Aug. 2011.

Akoglu et al., "Anomaly Detection in Large Graphs", CMU-CS-09-173, Nov. 2009.

Palla et al., "Quantifying social group evolution", 2007, pp. 1-11.

Parkkinen et al., "Graph visualization with latent variable models", In Proceedings of the Eighth Workshop on Mining and Learning with Graphs (MLG '10). ACM, New York, NY, USA, 2010, pp. 94-101. DOI=10.1145/1830252.1830265 http://doi.acm.org/10.1145/1830252.1830265.

Lazarevic et al., "A comparative study of anomaly detection schemes in network intrusion detection", Proc. 3rd SIAM International Conference on Data Mining, 2003, pp. 25-36.

Clauset et al., "Finding community structure in very large networks." Physical review E 70.6, 2004, 066111.

\* cited by examiner

1200

55_39_3  57_14_60

56_64_24

57_4_56  57_31_41

1210

39 → 64 → 14
        → 31
        → 4

(Timestamp 55)   (Timestamp 56)   (Timestamp 57)

FIG. 12

DYNAMIC GRAPH ANOMALY DETECTION FRAMEWORK AND SCALABLE SYSTEM ARCHITECTURE

CROSS REFERENCE TO OTHER APPLICATIONS

This application claims priority to U.S. Provisional Patent Application No. 61/838,104 entitled ANOMALY DETECTION FRAMEWORK FOR DYNAMIC GRAPH filed Jun. 21, 2013 which is incorporated herein by reference for all purposes.

BACKGROUND OF THE INVENTION

An anomaly is an outlier in a dataset that has a high or significant deviation from a majority distribution. Anomaly detection may be performed on machine generated event log data (e.g., network logs) to detect malware infections. Although applications of anomaly detection exist (e.g., in the field of malware detection), tools and/or user interfaces relating to the application of anomaly detection which have a richer set of features and/or capabilities would be desirable.

BRIEF DESCRIPTION OF THE DRAWINGS

Various embodiments of the invention are disclosed in the following detailed description and the accompanying drawings.

FIG. 12 is a diagram showing an embodiment of a zoomed-in view of a community evolution.

DETAILED DESCRIPTION

Figure 1:
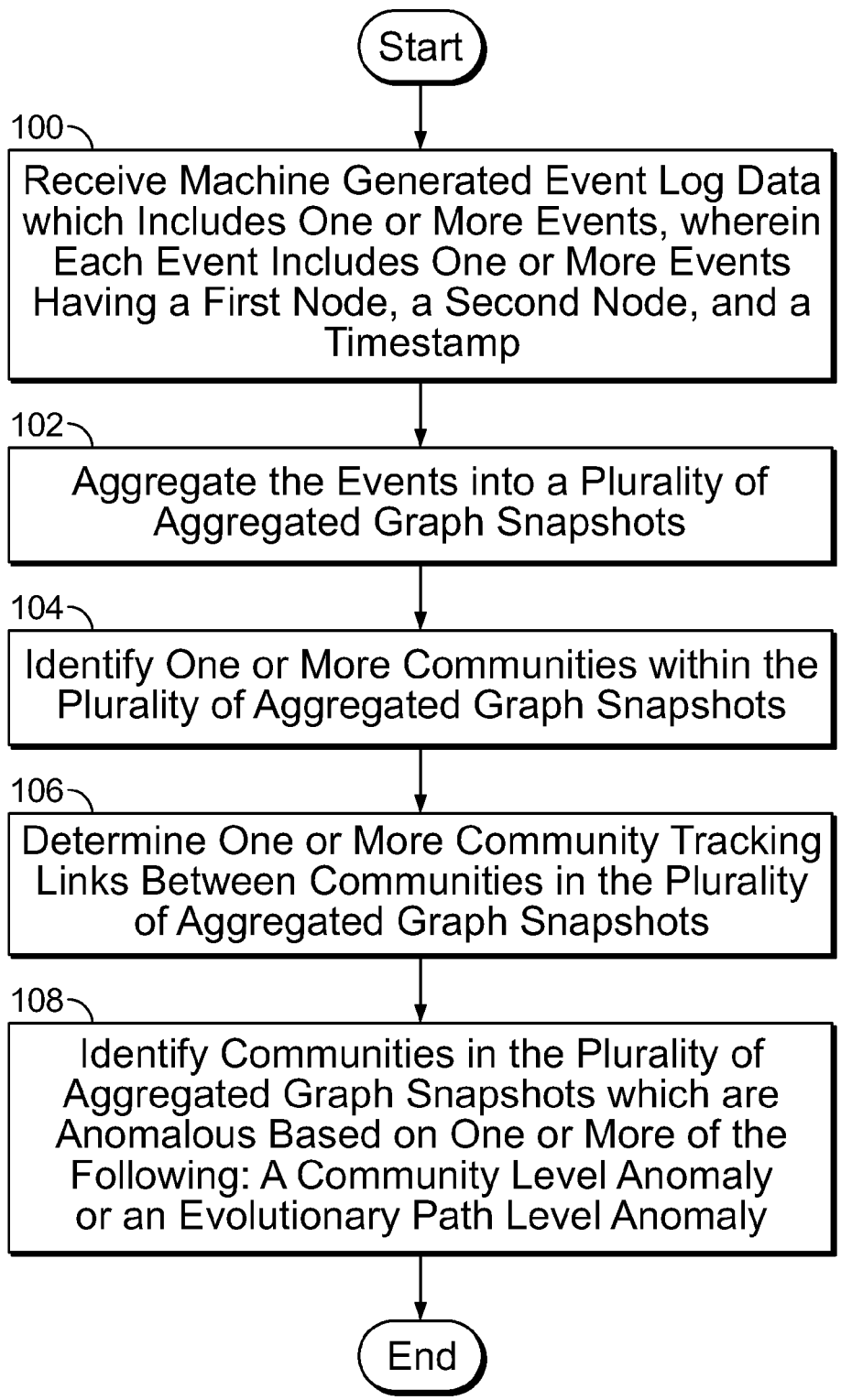
FIG. 1 is a flowchart illustrating an embodiment of a process for identifying communities in aggregated graph snapshots which have an anomalous evolutionary process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques and user interfaces for detecting or identifying communities which have an anomaly are described herein. In some embodiments, the anomaly is at the evolutionary path level. For example, most communities may exhibit a stable evolutionary process where there is a little or no merging (e.g., N communities→1 community) or splitting (e.g., 1 community→N communities) between birth and death. In one example, those communities which include a large split (e.g., there is a 1 to N split and N is relatively large) and/or which include a large merge (e.g., there is an N to 1 merge and N is relatively large) are flagged as anomalies. In some embodiments, the anomaly is at the community level. For example, a community may have an anomalous size (i.e., an anomalous number of vertices) compared to other communities. Or, a community may have an anomalous density (i.e., an anomalous number of edges, an anomalous ratio of edges to vertices, etc.) compared to other communities.

Compared to some other anomaly detection techniques, the anomaly detection techniques described herein are attractive because they are performed at a higher level. For example, some other anomaly detection techniques may operate at the vertex level, tracking vertices which are anomalous compared to other vertices. However, in enterprise data networks or social networks, there may thousands or even millions of vertices. Performing anomaly detection at the vertex level may be too low level and/or require too much information to be processed. In contrast, performing anomaly detection at the community level or at the evolutionary path level may be easier to manage and/or evaluate since a typical number of communities or a typical number of evolutionary paths is much smaller than a typical number of vertices. Those numbers may, for example, be in the dozens or hundreds as opposed to the thousands or millions.

Another advantage of an anomaly detection technique which only relies upon vertex level anomaly detection is that multiple levels of anomaly detection are supported. Hence a framework is provided which is adaptive, flexible, and/or a generalized approach for learning the intrinsic properties of the dynamic graph at different levels of granularity, which is critical in Big Data Analytics when human interventions of integrating prior knowledge into the computational models are difficult.

In some embodiments, the anomaly detection techniques and user interfaces described herein are performed on a massively parallel processing (MPP) database which is able to handle large amounts of data (i.e., "big data") which other systems may have trouble processing and/or managing. In some embodiments, the user interfaces described herein permit a user to explore underlying root causes of anomalies, for example by viewing parameters or characteristics associated with the anomaly, adjusting system parameters and observing the results (e.g., the new set of community and/or links formed, from which resulting anomalies are detected), and so on.

FIG. 1 is a flowchart illustrating an embodiment of a process for identifying communities in aggregated graph snapshots which have a community level anomaly or an evolutionary path level anomaly. In some embodiments, the process is performed by a (e.g., graphical) user interface which provides a variety of tools related to anomaly detection (e.g., the user interface has the ability to identify or flag anomalous communities) and/or community evolution (e.g., the user interface displays the lifecycle of one or more communities, such as birth, any merge(s), any split(s), and death).

At 100, machine generated event log data is received which includes one or more events, wherein each event includes one or more events having a first node, a second node, and a timestamp. To use graph terminology, the first node and second node are vertices in a graph; an event is an edge with a timestamp. If the machine generated event log data indicates that there was some communication between or association formed between the two nodes (i.e., vertices), then an edge exists between those two vertices. The lack of an edge corresponds to no communication or no association between two vertices.

Figure 2:
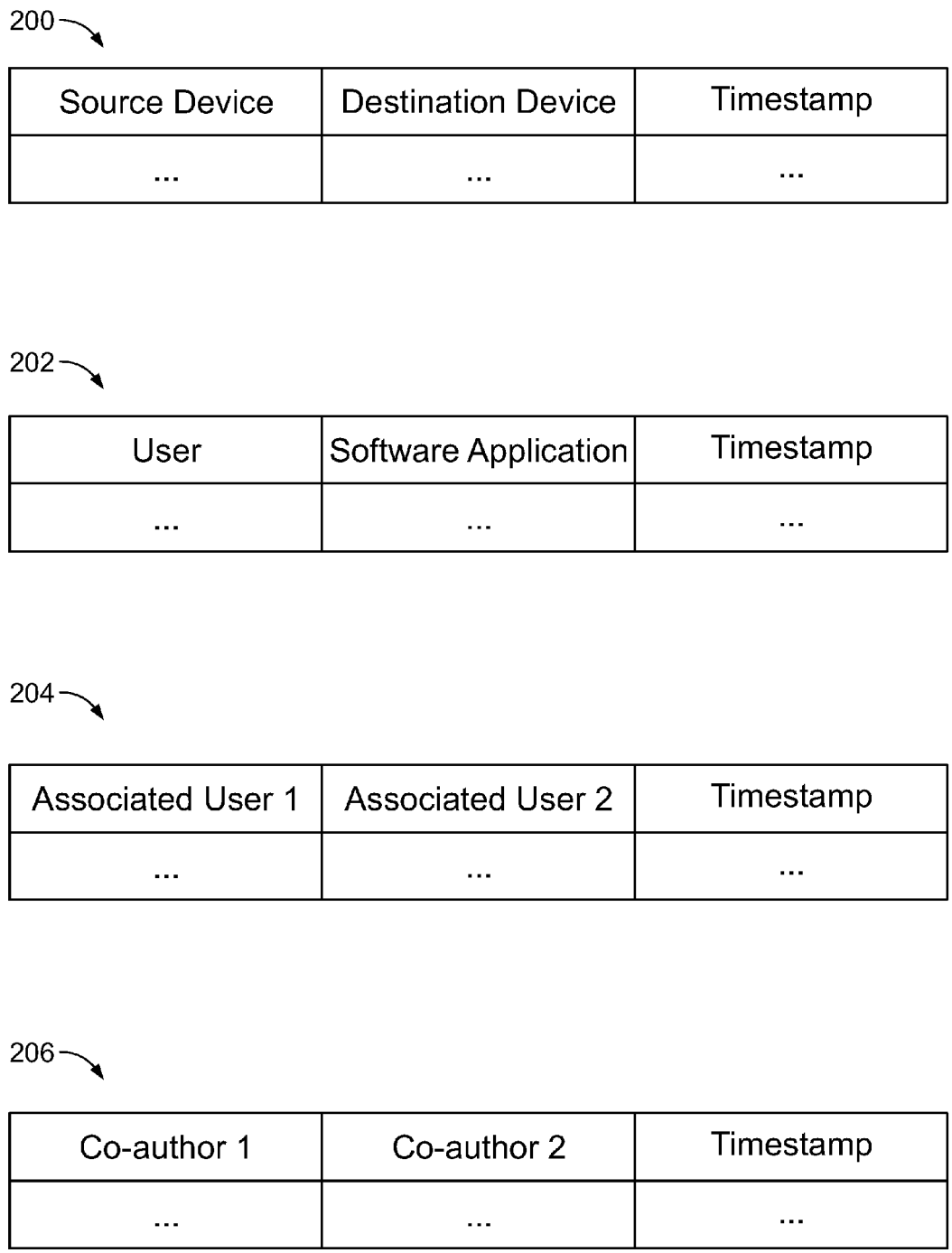
FIG. 2 shows various embodiments of machine generated event log data.

FIG. 2 shows various embodiments of machine generated event log data. In the first example, machine generated event log 200 includes a source device, a destination device, and a timestamp. In this example, communication between devices in network is recorded in the machine generated event log (e.g., some router which forwards packets in a network may record a source address and destination address contained in a packet header). The source device may be a computer (or other device identified by an IP address or other unique identifier) and the destination device may also be a computer or other device. The timestamp is the time at which the source device contacted or communicated with the destination device. In another example, the source device and the destination device are mobile telephones and are identified by telephone number and the timestamp is the time at which the source telephone called the destination telephone.

Machine generated event log 202 includes a user, a software application, and a timestamp when the user initiated use of the software application. In this example, usage by various users of various applications is tracked. In one example, a software application may be stored on and/or provided by an application server and/or may require a license which is provided by a license sever. In some such embodiments, machine generated event log 202 is generated by an application server or a license server. In various embodiments, the software application is an engineering related application (e.g., a source code management tool, such as Concurrent Versions System (CVS)) or a human resources or operations related application (e.g., PeopleSoft or SAP).

In the third example, machine generated event log 204 includes two associated users and a timestamp at which the association occurred or was created. In this example, machine generated event log 204 is generated in a social networking system or environment (e.g., Twitter, Facebook, LinkedIn, etc.) where one user may connect to or associate themselves with another user. In Twitter, an event in machine generated event log 204 may correspond to the time at which one user began following another user. In Facebook, an event in machine generated event log 204 may correspond to the time at which one user liked a page or friended another user. In LinkedIn, each event in machine generated event log 204 may correspond to the time at which one user accepted another user into their circle.

Machine generated event log 206 shows an example associated with co-authorship. For example, the two authors may be members of a fan fiction social network who come together to collaborate on publications using characters from specific literary world. If two or more authors collaborate, then an event is created for each pair of authors having a timestamp at which the fan fiction was published. Other examples of collaborating authors include academic authors (e.g., researchers) or students who collaborate on a journal article or term paper, respectively.

Returning to FIG. 1, at 102, the events are aggregated into a plurality of aggregated graph snapshots. A collection of events which spans some period of time (e.g., obtained from a machine generated event log at step 100) is sometimes referred to as a dynamic graph. A drawback associated with dynamic graphs is that there is not a substantial collection of processes available with which to process, manipulate, and/or analyze dynamic graphs. There is, however, a more substantial collection of processes which are capable of operating on a graph snapshot. (To use an analogy, a graph snapshot is like a still image and dynamic graphs are like video; to continue the analogy, while there are many processes which can input still images, there are few processes which can input video.) As such, it is desirable to aggregate the events (i.e., the dynamic graph) into a plurality of graph snapshots, hereinafter referred to as aggregated graph snapshots. There will then be more processes available to choose from with which to process (e.g., individually) each of the aggregated graph snapshots.

Figure 3A:
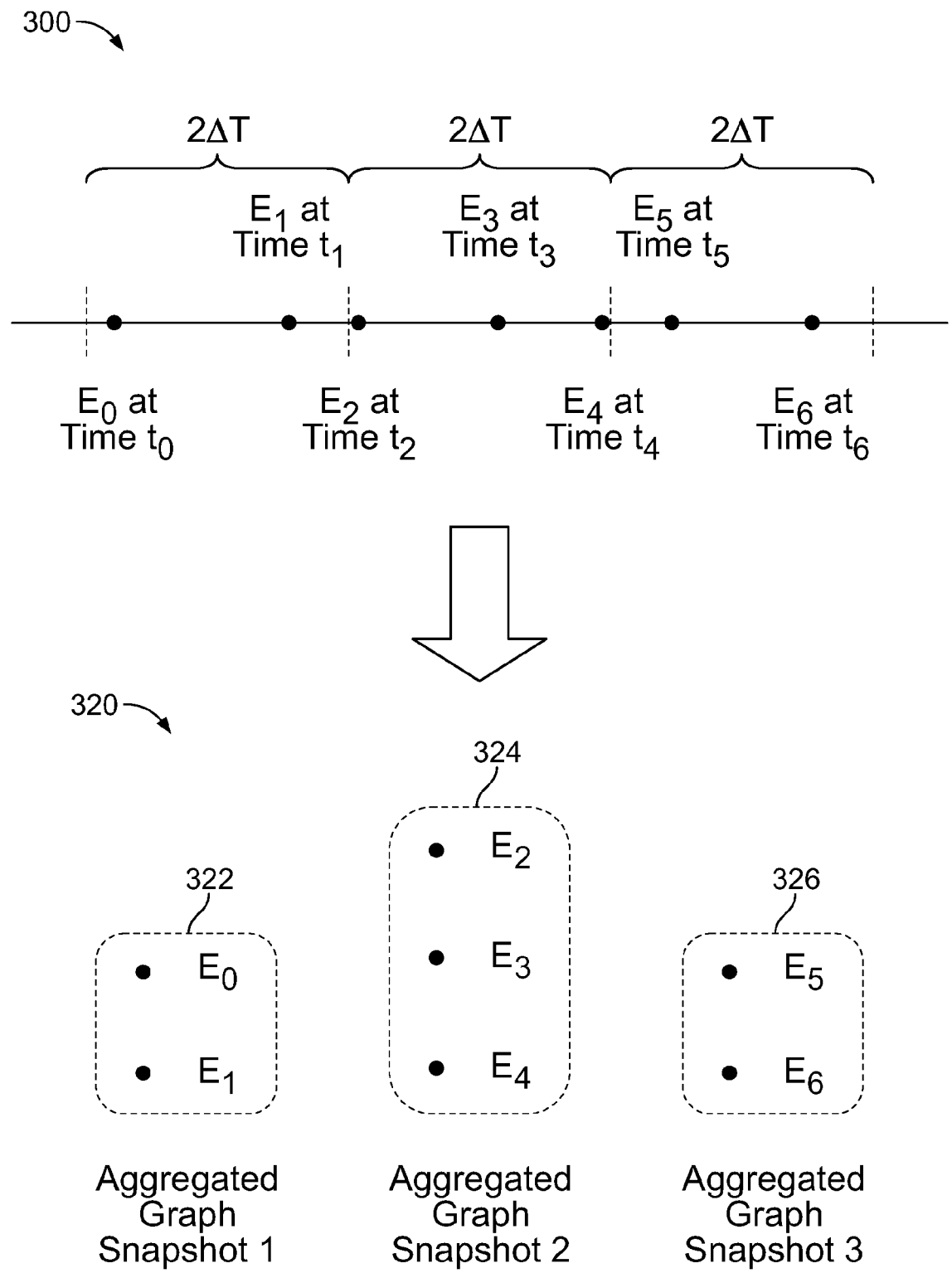
FIG. 3A shows an example of a dynamic graph which is aggregated into aggregated graph snapshots.

FIG. 3A shows an example of a dynamic graph which is aggregated into aggregated graph snapshots. In the example shown, diagram 300 shows a dynamic graph comprising a collection of events (e.g., from a machine generated event log) at various times. For example, event $E_0$ has a timestamp of $t_0$, event $E_1$ has a timestamp of $t_1$, and so on. For clarity and readability, edges and vertices are not shown; rather, each event is shown as a dot.

A dynamic graph can be denoted as a time series of static graphs, $Gt=(Vt, Et)$, where Vt is the vertex set at time t, and Et is the dynamic edge set at time t, $Et=(ut, vt)$ where ut, vt∈Vt.

Without loss of generosity, the time window can be overlapped with adjacent windows. Mathematically, an aggregated graph snapshot can be defined as integral of discrete dynamic edge events:

$$Ht = \int_{T-\Delta T}^{T+\Delta T} Gt\, dt.$$ Equation (1)

Diagram 320 shows example aggregated graph snapshots which result from the aggregation of the dynamic graph shown in diagram 300. In this example, first aggregated graph snapshot 322 includes events $E_0$ and $E_1$, second aggregated graph snapshot 324 includes events $E_2$, $E_3$, and $E_4$, and third aggregated graph snapshot 326 includes events $E_5$ and $E_6$.

Figure 3B:
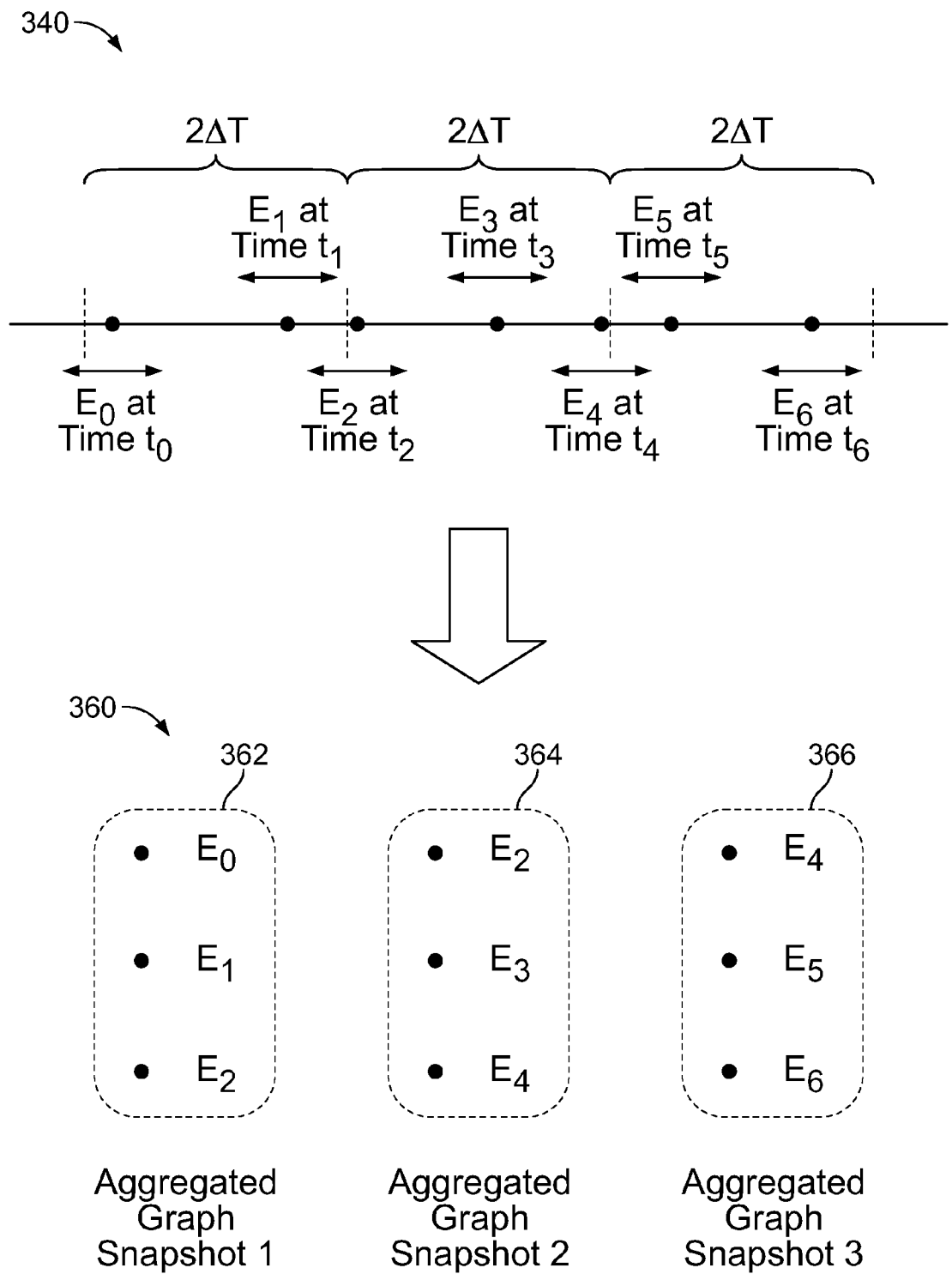
FIG. 3B shows an example of a dynamic graph which is aggregated into a plurality of aggregated graph snapshots using a kernel function.

FIG. 3B shows an example of a dynamic graph which is aggregated into a plurality of aggregated graph snapshots using a kernel function. In some embodiments, aggregation into a plurality of aggregated graph snapshots includes using a window or kernel function (e.g., a non-parametric kernel function, such as a Parzen window) to generate a smoother and/or more robust snapshot. In such embodiments, an aggregated graph snapshot is defined as:

$$Ht = \int_{T-\Delta T}^{T+\Delta T} GtP(u-t)\, dt$$ Equation (2)

where $P(\cdot)$ is some window or kernel function.

Conceptually, the above integral may be thought of as "smearing" Gt. In diagram 340, this smearing effect is representing using left arrows and right arrows next to each event in diagram 340; this smearing results in the aggregated graph snapshots shown in diagram 360. In this example, first aggregated graph snapshot 362 includes events $E_0$, $E_1$, and $E_2$, second aggregated graph snapshot 364 includes events $E_2$, $E_3$, and $E_4$, and third aggregated graph snapshot 366 includes events $E_4$, $E_5$, and $E_6$. Note that because of the smearing, the first aggregated graph snapshot now also includes event $E_2$ (whereas first aggregated graph snapshot 322 in FIG. 3A did not) and the third aggregated graph snapshot now also includes event $E_4$ (whereas third aggregated graph snapshot 326 in FIG. 3A did not).

Returning to FIG. 1, in some embodiments, steps 100 and 102 are combined. The following figure shows an example of a MPP database which is configured to generate aggregated graph snapshots and steps 100 and 102 are combined.

Figure 4:
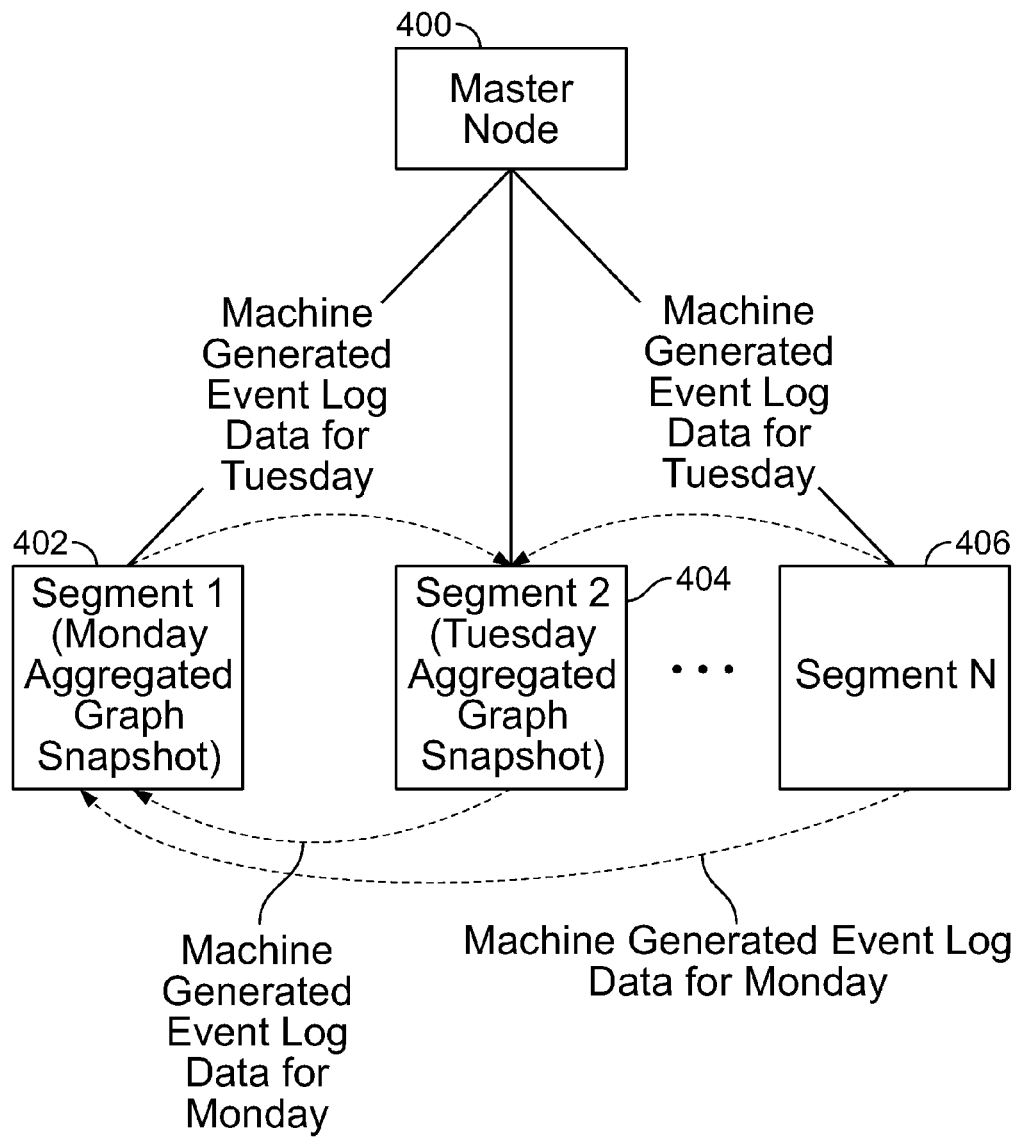
FIG. 4 is a diagram showing an embodiment of a MPP database system which is partitioned by day to generate aggregated graph snapshots for days of the week.

FIG. 4 is a diagram showing an embodiment of a MPP database system which is partitioned by day to generate aggregated graph snapshots for days of the week. In the example shown, the MPP database includes master node 400 and N segments 402, 404 and 406. The MPP database is partitioned by day of the week so that an aggregated graph snapshot for Monday is generated on segment 402, an aggregated graph snapshot for Tuesday is generated on segment 404, and so on. The MPP system does this by having each segment sends appropriate machine generated event log data to the appropriate segment. For example, segments 404 and 406 send machine generated event log data having a Monday timestamp to segment 402. Segments 402 and 406 send machine generated event log data having a Tuesday timestamp to segment 404, and so on.

In some embodiments, segments 402, 404, and 406 are configured to generate aggregated graph snapshots using a window or kernel function (e.g., as shown in FIG. 3B). For example, segments may be configured (e.g., if an event which occurs within ±2 hours of midnight) to send machine generated event log data associated with that event to the segments associated with the two closest days of the week. For example, suppose segment 406 has some machine generated event log data with a timestamp of Monday at 11:52 pm. That machine generated event log data would be sent to both segment 402 (where a Monday aggregated graph snapshot is generated), as well as segment 404 (where a Tuesday aggregated graph snapshot is generated).

Returning to FIG. 1, at 104, one or more communities within the plurality of aggregated graph snapshots are identified. For example, in FIG. 3A, communities within aggregated snapshot 322, 324, and 326 are determined based on the vertices and edges included in each aggregated graph snapshot. In some embodiments, a vertex in an aggregated graph snapshot is permitted to be a member of at most one community at step 104.

In one example of step 104, a fast-greedy community detection technique is used. Initially, every vertex (e.g., a source device, a destination device, a user, a software application, etc.) belongs to a separate community, and communities are merged one by one in a greedy fashion. In every step, the two communities being merged are the ones that result in the maximal increase in modularity. The time complexity of this technique is almost linear on sparse graphs, which is suitable for analyzing data in communication networks. A fast-greedy community detection technique is attractive due to its efficiency and quality results.

At 106, one or more community tracking links between communities in the plurality of aggregated graph snapshots are determined. In one example, a modified Jaccard coefficient $$\left(\text{i.e., } \frac{A \cap B}{\min(A, B)}\right)$$

is used to determine community tracking links between communities in adjacent aggregated graph snapshots. The following figure shows an example of this.

Figure 5:
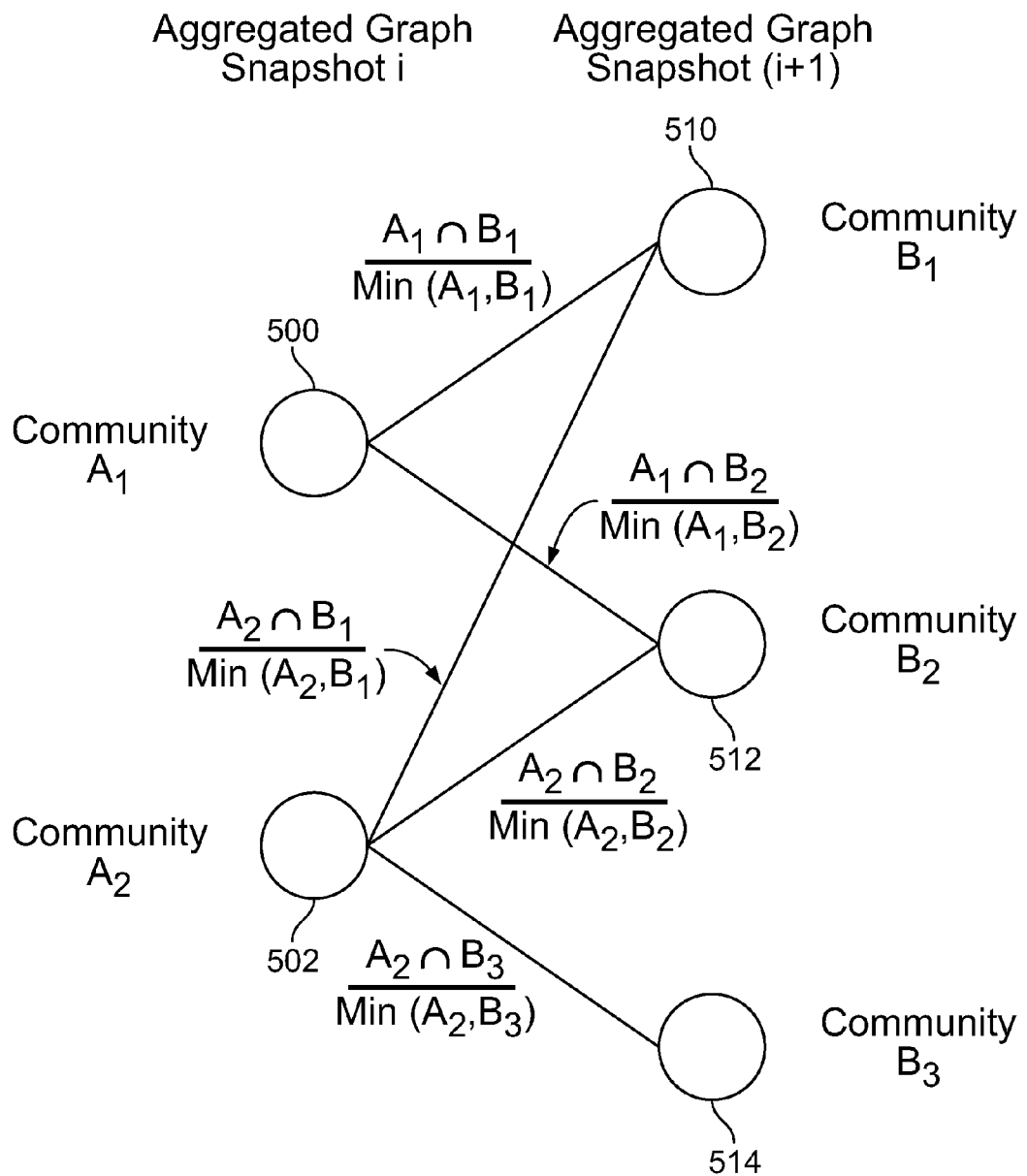
FIG. 5 is a diagram showing an embodiment of community tracking links determined between communities in adjacent aggregated graph snapshots using a modified Jaccard coefficient.

FIG. 5 is a diagram showing an embodiment of community tracking links determined between communities in adjacent aggregated graph snapshots using a modified Jaccard coefficient. In the example shown, aggregated graph snapshot i includes communities 500 and 502 and aggregated graph snapshot (i+1) includes communities 510, 512, and 514. The two aggregated graph snapshots shown are adjacent to each other and community tracking links between communities in the two aggregated graph snapshots are being determined in the example shown.

For each possible pair of communities, the modified Jaccard coefficient, $$\left(\text{i.e., } \frac{A \cap B}{\min(A, B)}\right)$$

is calculated. The numerator, $A \cap B$, is the number of vertices in common between community A and community B. Referring back to diagram 202 in FIG. 2 as an example, if a user (one example of a vertex) exists in community A as well as in community B, then the count $A \cap B$ would be incremented by one. The denominator, $\min(A, B)$, is the smaller of the number of vertices in community A or community B (i.e., the smaller of: the size of community A or the size of community B).

If the modified Jaccard coefficient is greater than a threshold, then a community tracking link between that pair of communities is created or defined. Conversely, if the modified Jaccard coefficient is less than a threshold, then no community tracking link is created or defined between that pair of communities.

In comparison, some other techniques may use the standard Jaccard coefficient, which is $$\frac{A \cap B}{A \cup B}.$$

The number of elements in the set (A∪B) is greater than or equal to min(A, B), so $$\frac{A \cap B}{A \cup B}$$

will be less than or equal to $$\frac{A \cap B}{\min(A, B)}.$$

The smaller values of the (standard) Jaccard coefficient do not produce as good links as the larger values of the modified Jaccard coefficient and so the modified Jaccard coefficient is preferred over the Jaccard coefficient.

Returning to FIG. 1, at 108, communities in the plurality of aggregated graph snapshot are identified which are anomalous based on one or more of the following: a community level anomaly or an evolutionary path level anomaly. In one evolutionary path level example, a typical evolutionary process may include few or no merges and few splits (e.g., one community is linked to another single community, which in turn is linked to another, single community, and so on). A community which has a large merge and/or a large split in its evolutionary process may be an anomaly compared to other communities.

In some embodiments, an anomaly identified at step 108 includes a community level anomaly, one community may be much smaller (larger) in size than other communities and it is flagged as anomalous. Or, one community may have a density (e.g., the number of edges, or the ratio of edges to vertices) that is much smaller (larger) than other communities and that community is flagged as anomalous. Some other community level anomalies may relate to one or more of the following: a modified Jaccard coefficient, a Jaccard coefficient, the size of a front community (F), the size of a current community (C), the ratio of F to C, the size of community outgoing edges (e.g., the number of edges (in a given community) which are going out to another community), or the size of community incoming edges (e.g., the number of edges (in a given community) which are coming in from another community).

In some embodiments, in addition to performing community level anomaly detection and/or evolutionary path level anomaly detection, a process or user interface is capable to performing vertex level anomaly detection (e.g., if desired). For completeness, it may be desirable to provide a user interface or process which supports as many levels of anomaly detection as possible so that a user can choose how or at what level to perform anomaly detection.

A variety of techniques can be utilized to identify anomalies (e.g., at a variety of levels) in the dynamic graph at step 108. Example techniques include (but are not limited to) local outlier factor (LOF), principal component analysis, and K-nearest neighbor.

The following figures show some examples of user interfaces which present one or more anomalies detected (e.g., using the process shown in FIG. 1), specify one or more parameters or configurations which are used in the process of Figure, and/or which enable a user to explore root causes and/or characteristics of anomalous communities. These user interfaces are meant to be exemplary and are not intended to be limiting.

Figure 6:
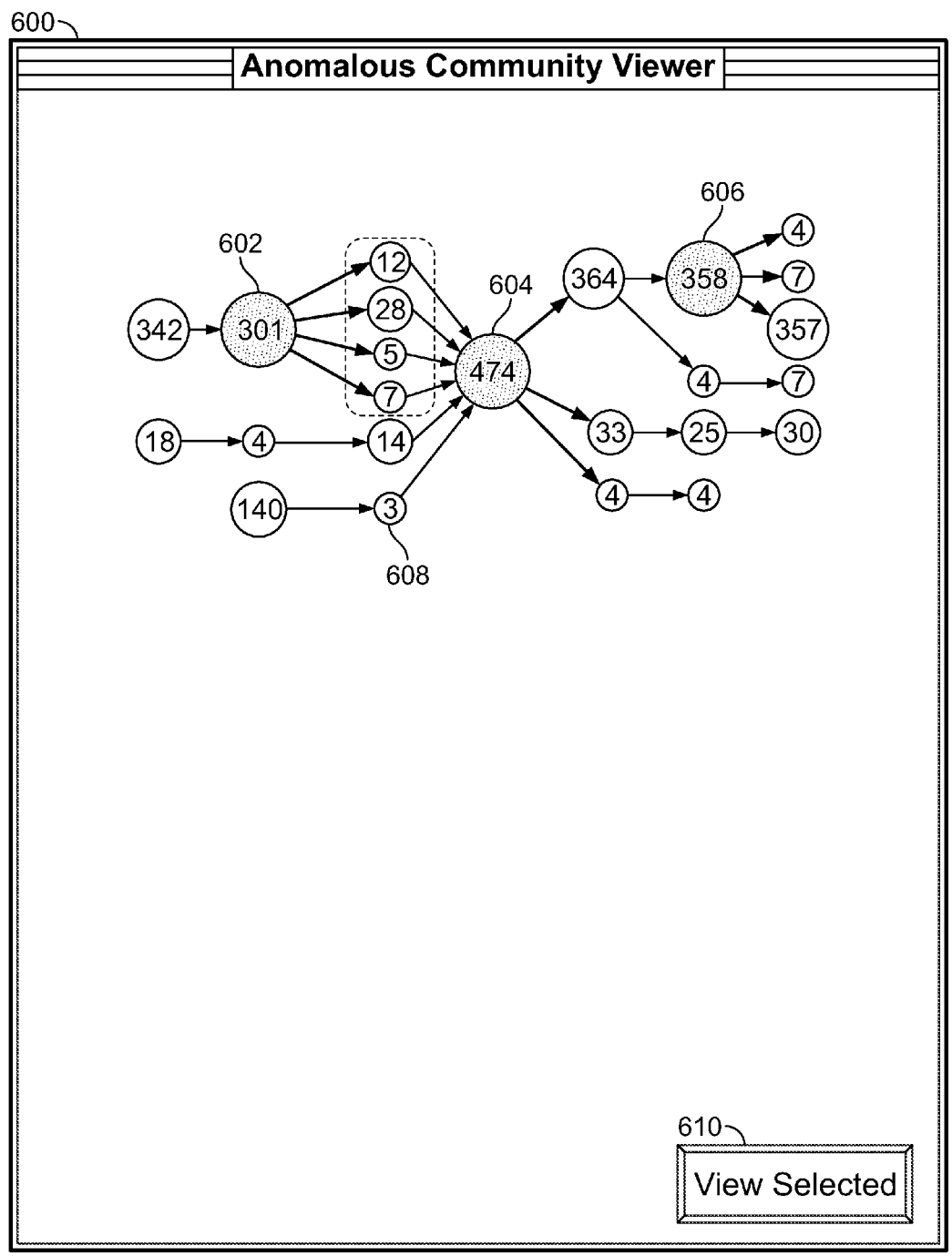
FIG. 6 is a diagram illustrating an embodiment of a user interface which flags anomalous communities within a plurality of aggregated graph snapshots.

FIG. 6 is a diagram illustrating an embodiment of a user interface which flags anomalous communities within a plurality of aggregated graph snapshots. In the example shown, user interface 600 includes seven aggregated graph snapshots which are arranged in columns in user interface. Within each column, the communities within that aggregated graph snapshot are shown or otherwise indicated. For example, the first (i.e., leftmost) aggregated graph snapshot contains two communities, the second aggregated graph snapshot contains three communities, and so on. In this example, the period of time covered is 90 days.

Community tracking links (e.g., determined at step 106 in FIG. 1) are shown as arrows between communities in adjacent aggregated graph snapshots. In some cases, a community splits into multiple communities in the next aggregated graph snapshot. In some cases, multiple communities merge into a single community in the next aggregated graph snapshot.

The numbers displayed over each community indicate the number of vertices contained within that particular community. For example, if the vertices include users and software applications (as shown in the example of diagram 202 in FIG. 2), then the number displayed over each community would indicate the number of users and/or software applications associated with that particular community. The number of vertices in a community may sometimes be referred to as the size of a community. In some other embodiments, the number of edges associated with each community is displayed (e.g., in addition to or as an alternative to the number of vertices).

Communities which are flagged as anomalous by the user interface are indicated in red. In this particular example, communities 602, 604, and 606 are flagged as anomalous. In this example, communities 602, 604, and 606 are flagged as anomalous because of the anomalous number of merges and/or splits associated with that community. Put another way, those communities have evolutionary processes which are anomalous. For example, community 602 splits into four communities and community 606 splits into three communities, which is anomalous behavior compared to the rest of the communities (e.g., which tend to have a link to only one community in the next respective aggregated graph snapshot). Similarly, community 604 is flagged as an anomaly because six communities have merged to form community 604, and the other communities tend to be linked to only one community from a previous aggregated graph snapshot. Note that although this example user interface flags communities with anomalies at the evolutionary path level, anomalies at other levels may be identified (e.g., in addition to or as an alternative to evolutionary path level anomalies), such as community level anomalies or vertex level anomalies.

One advantage to the user interfaces and processes described herein is that system specific quirks or behaviors of its communities over time are taken into consideration (i.e., there is some sense of context). For example, consider two computer networks. One is associated with a company where employees travel frequently and its various offices around the country offer "hoteling" where out-of-town employees can use a computer while they are in that town. In such a computer system, communities only live a short time, merge a lot, and/or split a lot because of the transient nature of the system. In that system, a lot of merging or splitting may not be flagged as anomalous because it is not in fact anomalous. In another other company where employees do not travel as much and communities have more stable evolutionary processes, a large split or large merge would be flagged as anomalous.

To use another example, suppose one system is processing data from or associated with a computer network and another system is processing data from or associated with a physical or biological system. Merging may not be as significant of an anomaly in a computer network data compared to biological data. The user interfaces and processes described herein take the particular behavior of a system or data over time into consideration and so what is anomalous in one system is not anomalous in another. There is no anomalous structure which is assumed or predefined.

Another advantage to the user interface and processes described herein is that a large amount of data can be reduced to an amount of information that is more easily digestible. For example, the number of events may be in the millions and the number of edges may be in the thousands. For an administrator trying to detect malware or system failures, this may be too much information to easily digest. In contrast, in FIG. 6, the number of aggregated graph snapshots (in this example, seven) and the number of total communities (in this example, 24) is easily digested by a viewer. If a user wants more detail than is shown in user interface 600, the user interface provides that ability to dive down and explore potential root causes of the anomaly, aid in deciding whether the anomaly should be fixed or otherwise addressed (e.g., is it malicious or harmless), and so on. Some examples of this are described in further detail below. The following figure shows an example where community 602 is selected (e.g., by clicking on it using a mouse) and then button 660 (i.e., "view selected") is selected, which causes the following user interface to be presented in response.

Figure 7:
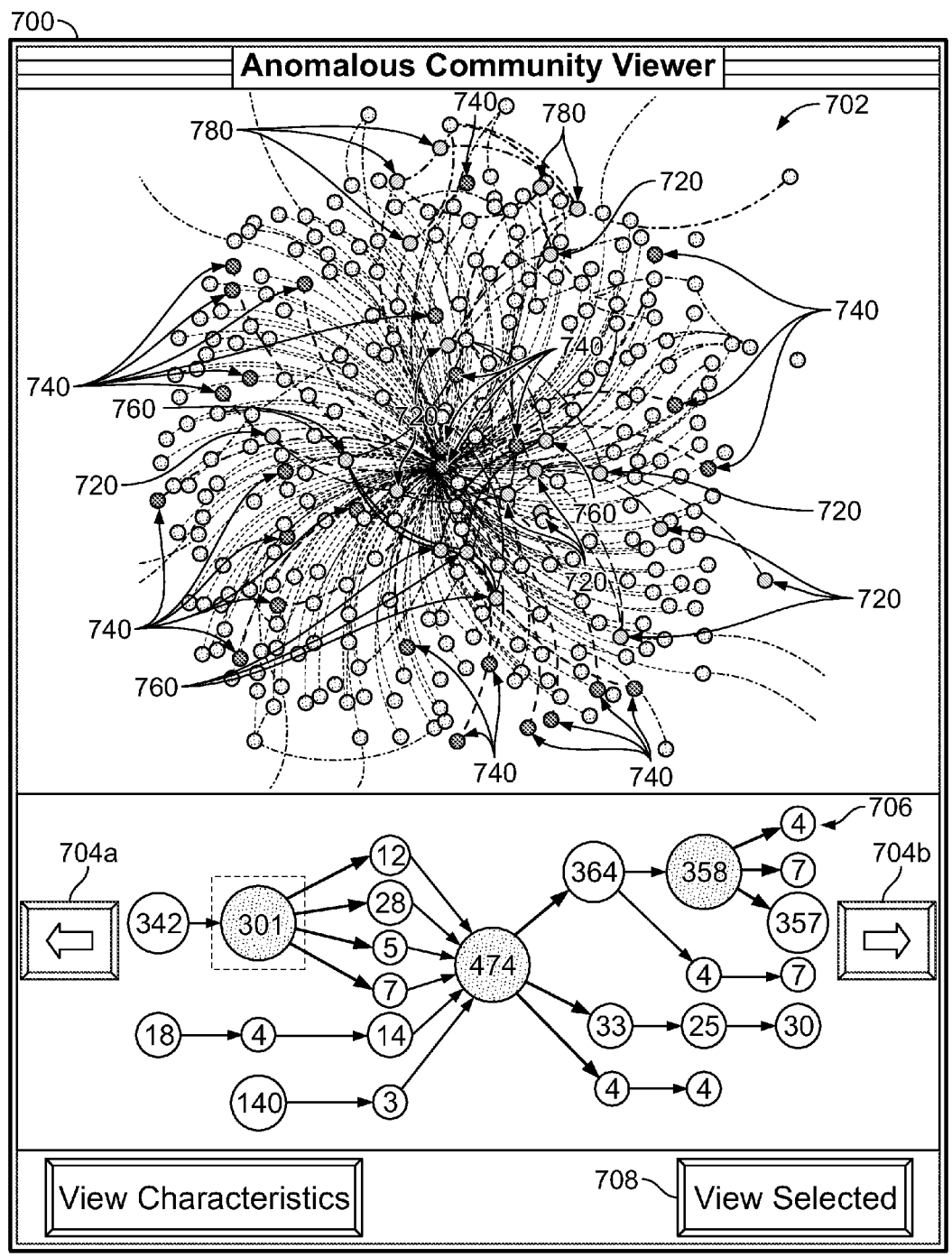
FIG. 7 is a diagram illustrating an embodiment of a user interface which displays a selected community.

FIG. 7 is a diagram illustrating an embodiment of a user interface which displays a selected community. In the example shown, the user has selected (anomalous) community 702 and more detailed information about community 702 is shown. In this example, vertices are shown as circles and edges in the community are shown as lines. Legend 706 is used to indicate which one or more communities are being displayed in more detail.

To indicate which vertices in community 702 are associated with which communities in the next aggregated graph snapshot, vertices are colored appropriately. This may be referred to as foreshadowing since something that subsequently occurs is indicated or conveyed. Vertices 720 (in green) are associated with a first community in the next aggregated graph snapshot which includes 12 vertices. Vertices 740 (in blue) are associated with a second community in the next aggregated graph snapshot which includes 28 vertices. Vertices 760 (in red) are associated with a second community in the next aggregated graph snapshot which includes five vertices. Vertices 780 (in yellow) are associated with a second community in the next aggregated graph snapshot which includes seven vertices. Note that the number of colored vertices in user interface 700 do not necessarily match the number of edges in the communities in the next aggregated graph snapshot (e.g., because some vertices are born or die, or are associated with a different community). For example, there are 11 vertices colored green (i.e., vertices 720) in user interface 700, but in the next aggregated graph snapshot, the relevant community has 12 vertices (e.g., because at least one new vertex has joined the community).

If desired, a user may dive down even further. For example, a user may select a vertex and then select button 708 (i.e., "view selected") in order to view even more detailed information about the selected vertex. In another example, a grid or array (where the columns correspond to aggregated graph snapshots and the rows correspond to connected vertices or vice versa) is used to indicate which vertices a selected vertex is connected to (i.e., via an edge) for each of the plurality of aggregated graph snapshots. In some embodiments, an edge is selected, and the (e.g., raw) machine generated event log data associated with the edge (and connected vertices) is displayed.

User interface 700 includes navigation arrows 704a and 704b which permit a user to navigate to linked communities in the prior aggregated graph snapshot or in the next aggregated graph snapshot, respectively. The following figure shows an example user interface displayed in response to selecting right (i.e., next) navigation arrow 704b.

Figure 8:
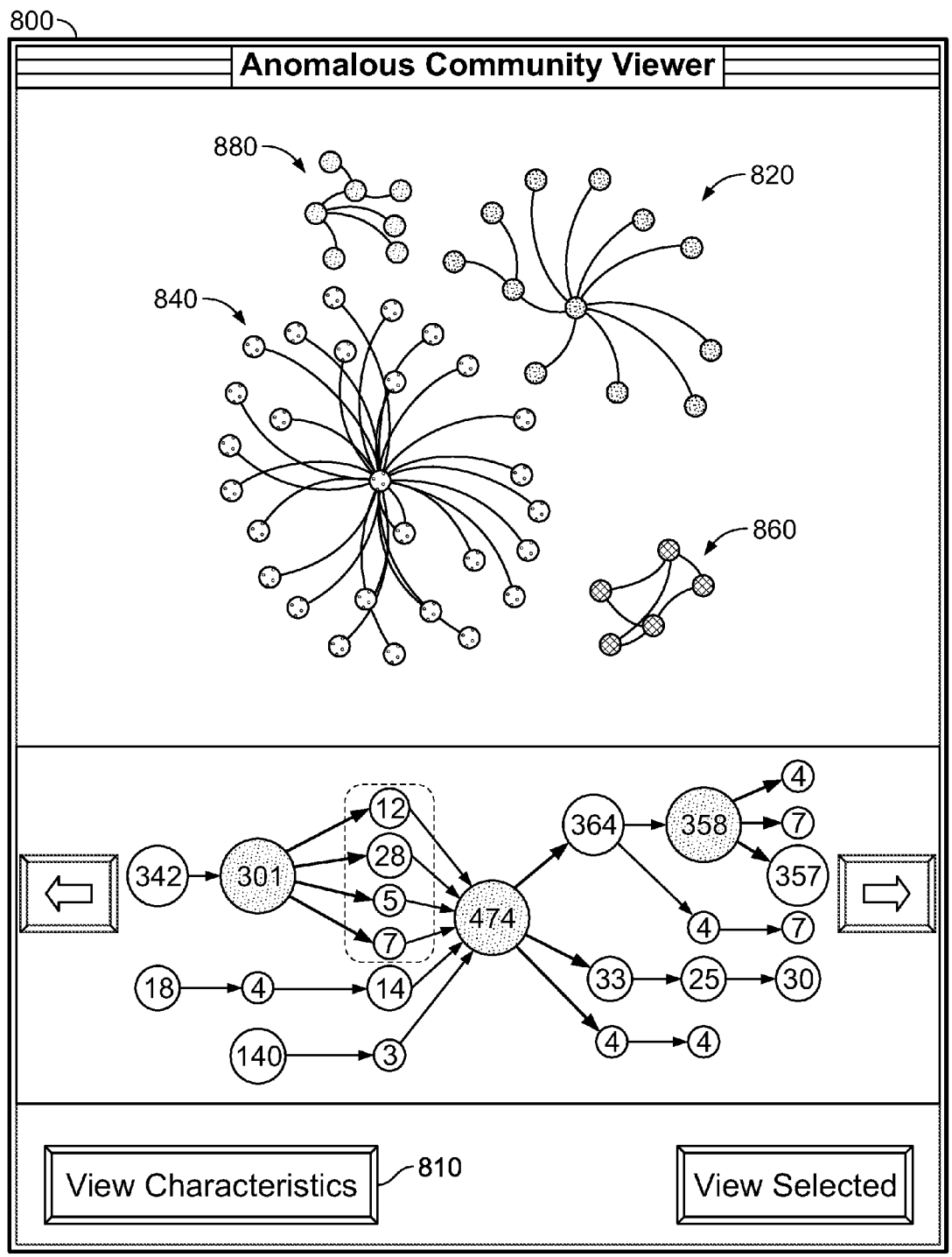
FIG. 8 is a diagram illustrating an embodiment of a user interface which displays linked communities in a next aggregated graph snapshot in response to selecting a navigation arrow.

FIG. 8 is a diagram illustrating an embodiment of a user interface which displays linked communities in a next aggregated graph snapshot in response to selecting a navigation arrow. In user interface 800, communities 800, 820, 840, and 860 are linked to the previously presented community (i.e., community 700 in FIG. 7) because they split out from community 700 in FIG. 7. In response to selecting next navigation arrow 704b in FIG. 7, the edges and vertices associated with communities 800, 820, 840, and 860 are displayed. Note that the colors of communities 800, 820, 840, and 860 match those of the related vertices in FIG. 7.

If desired, a user can explore various characteristics associated with a selected and/or displayed community. The following figure shows an example of the information presented when "view characteristics" button 810 is selected.

Figure 9:
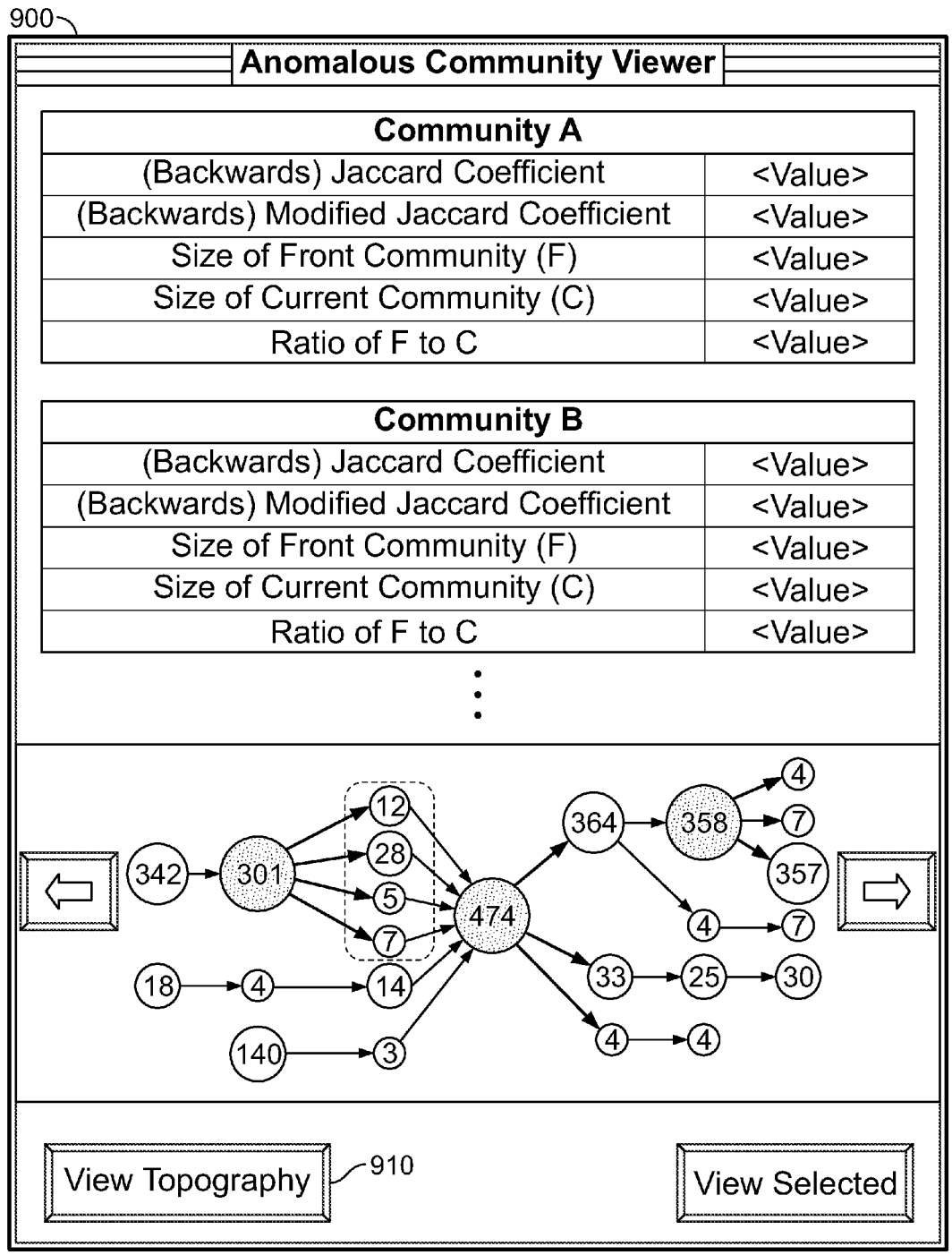
FIG. 9 is a diagram illustrating an embodiment of a user interface which displays characteristics of one or more selected communities.

FIG. 9 is a diagram illustrating an embodiment of a user interface which displays characteristics of one or more selected communities. In the example shown, the following characteristics are calculated and displayed for each of the four exemplary selected communities: a Jaccard coefficient, a modified Jaccard coefficient, a size of a front community (F), a size of a current community (C), and a ratio of F to C.

In user interface 900, a (modified) Jaccard coefficient is calculated based on a given community and a linked community from the prior aggregated graph snapshot (i.e., in the backwards direction). Note that a (modified) Jaccard coefficient is not calculated in the forward direction, because in some cases a given community splits into multiple communities, so a single or representative (modified) Jaccard coefficient cannot be calculated in the forward direction.

The size of a front community refers to the number of vertices in the most recently appearing community to which a given community is linked. For example, in FIG. 6, the value of that parameter for community 602 would be 342; the value of that parameter for community 608 would be 140.

To return to the previous user interface, a user may select "view topography" button 910.

Figure 10:
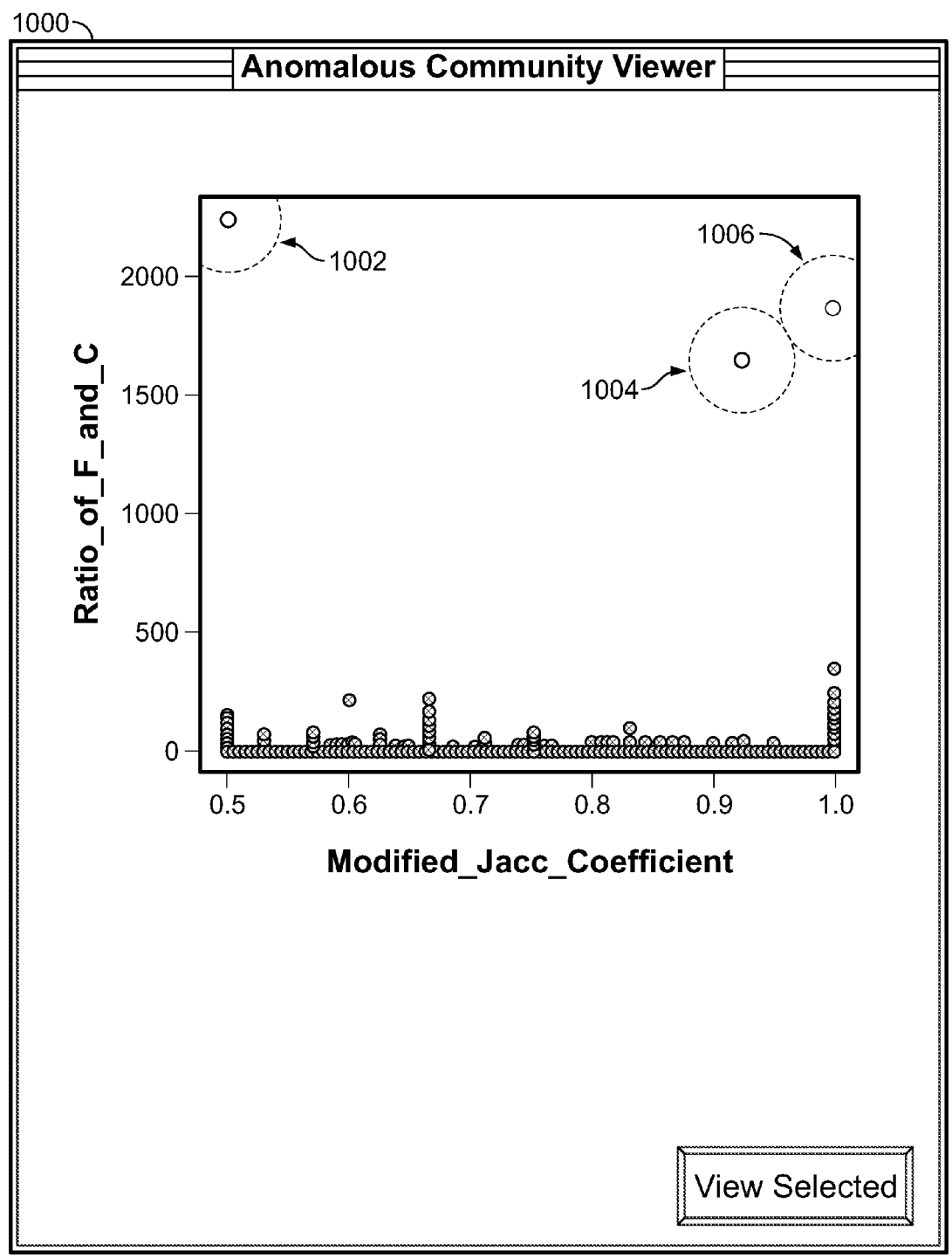
FIG. 10 is a diagram showing an embodiment of a user interface which flags anomalous communities using a two feature scatter plot.

FIG. 10 is a diagram showing an embodiment of a user interface which flags anomalous communities using a two feature scatter plot. In the example shown, user interface 1000 shows a two feature scatter plot where the x-axis of the graph corresponds to a modified Jaccard coefficient and the y-axis corresponds to the ratio of a size of a front community (F) to a size of a current community (C). Along the x-axis, the modified Jaccard coefficient values are evenly distributed and there are no anomalous outliers. However, along the y-axis, there are three anomalous values which are circled (i.e., data points 1002, 1004, and 1006). Data points 1002, 1004, and 1006 correspond to anomalous communities 602, 604, and 606 (not necessarily respectively).

User interface 1000 is similar to user interface 600 in FIG. 6, in that both user interfaces identify or flag communities which are anomalies compared to other communities in the plurality of aggregated graph snapshot, but the information is presented differently. Any combination, sequencing, or arrangement of the two user interfaces may be used as desired.

Figure 11:
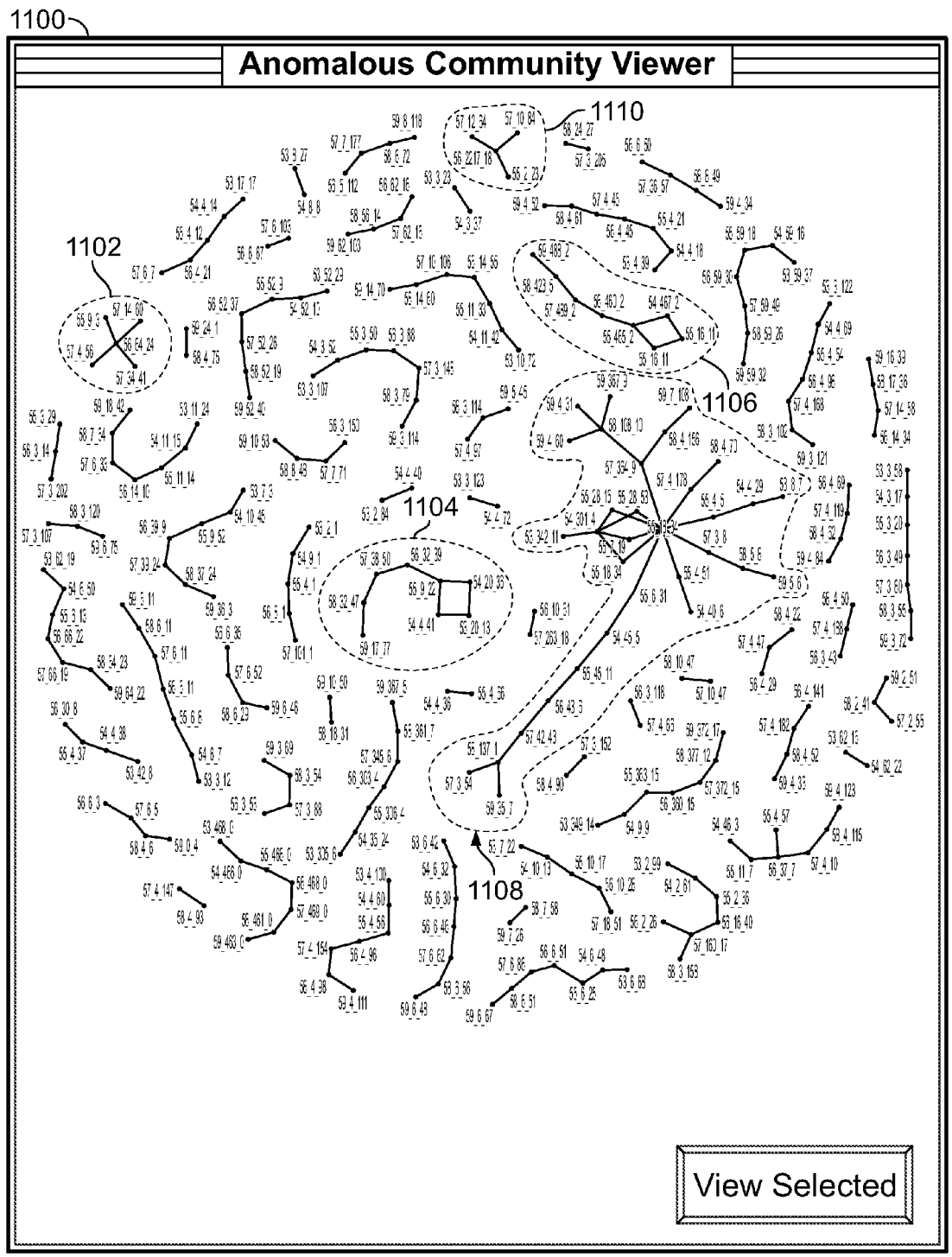
FIG. 11 is a diagram showing an embodiment of a user interface which shows community evolution using vertex notation.

FIG. 11 is a diagram showing an embodiment of a user interface which shows community evolution using vertex notation. In the example shown, a week's worth of evolutions are shown. With vertex notation, each node is identified by or associated with a tuple, in this example comprising a timestamp (T), the size (S) of the community at that timestamp, and a community identifier (ID) for that community at that timestamp (i.e., T_S_ID). Naturally, some other embodiments may use some other types of tuples (e.g., it may not be important or necessary to display the community identifier).

For clarity, FIG. 12 shows an embodiment of a zoomed-in view of community evolution 1102. In diagram 1200, the community evolution in vertex notation is shown. In diagram 1210, the same community evolution is shown, but in the form used in FIG. 6.

Returning to FIG. 11, user interface 1100 may be attractive as a way to identify anomalous communities, because anomalous numbers of splits and/or merges are easy to spot, making anomalous communities (i.e., having anomalous evolutions) easy to spot. For example, most communities have very little merging or splitting, which results in a line with no branches or loop backs. As such, anomalies can be very easily detected. In this example, community evolutions 1104, 1106, and 1108 includes loops and those loops are easy to spot. Similarly, community evolutions 1102 and 1110 have branches and those branches are easy to spot.

Although not shown herein, in some other embodiments, anomalous communities may be explicitly flagged or identified in some manner, for example by using font colors for tuples in anomalous communities (e.g., a font color of red) and different line colors connecting such tuples (e.g., line color of red).

Figure 13:
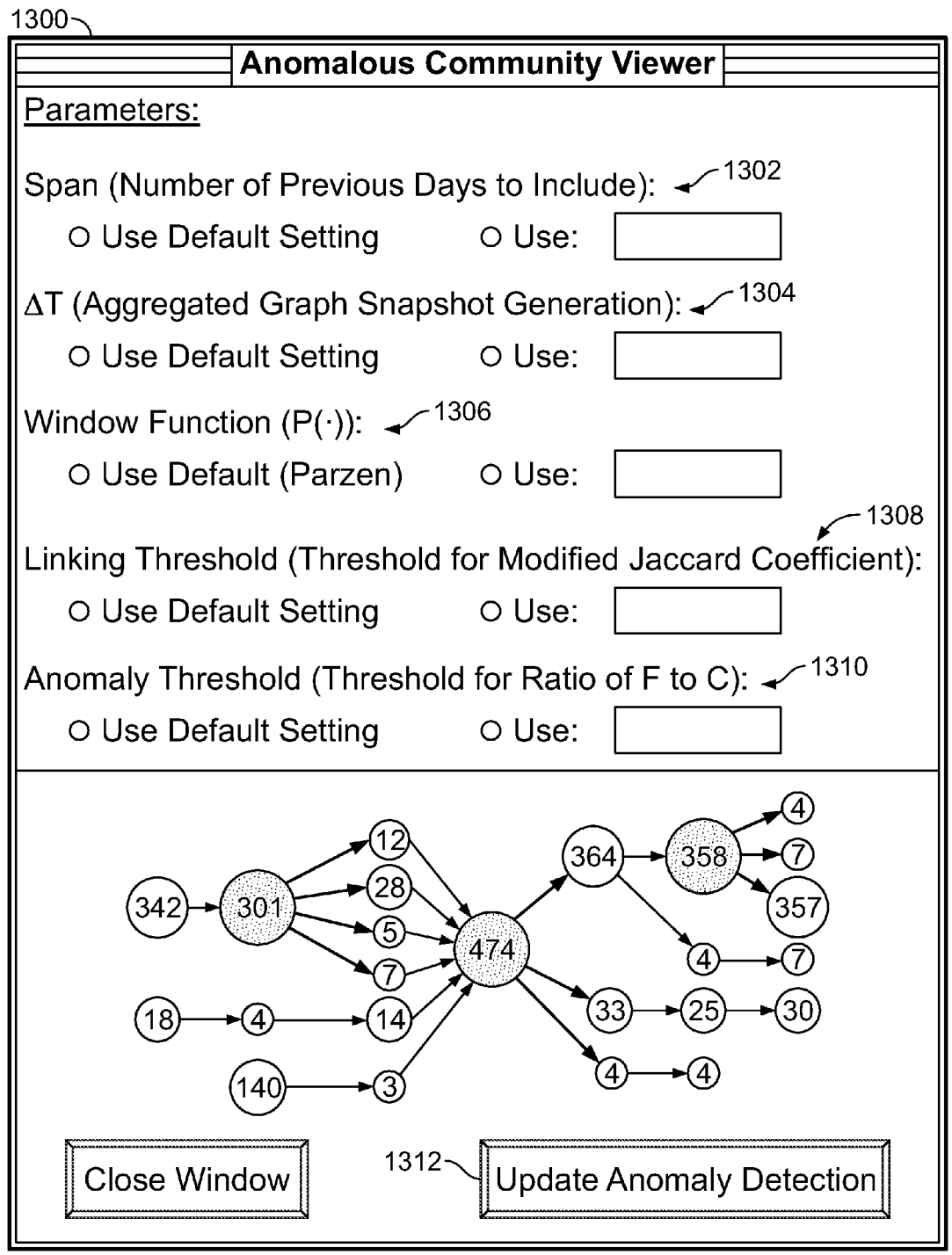
FIG. 13 is a diagram showing an embodiment of a user interface which enables a user to adjust parameters.

FIG. 13 is a diagram showing an embodiment of a user interface which enables a user to adjust parameters. In the example shown, user interface 1300 includes span (1302) which permits the user to specify whether a default span should be used, where a span corresponds to the number of previous days to include (e.g., at step 100 in FIG. 1), or if a user-defined span should be used. In one example, the default span is 90 days.

$\Delta T$ 1304 is a parameter associated with generating aggregated graph snapshots. For example, $\Delta T$ may be the value shown in Equations (1) and (2) and/or the ranges shown in FIGS. 3A and 3B, thus affecting how far apart aggregated graph snapshots are and/or the number of aggregated graph snapshots generated (which is also depends upon the span). In FIG. 1, the $\Delta T$ specified in $\Delta T$ 1304 is used at step 102 to aggregate events into aggregated graph snapshots.

Window function 1306 is used to specify a window function, for example used to generate "smoothed out" aggregated graph snapshots at step 102 in FIG. 1. Equation (2) shows (e.g., mathematically) how a specified window function may be used to generate aggregated graph snapshots. In user interface 1300, a Parzen window is the default window. Although not shown herein, in some embodiments, window parameters (e.g., affecting the shape of the window) may be specified via a user interface (e.g., the height or peak of a window, the width or spread of window, etc.).

Linking threshold 1308 is used to specify a linking threshold which is compared against a modified Jaccard coefficient and is used to determine links between communities in adjacent aggregated graph snapshots (e.g., at step 106 in FIG. 1). Reducing this value enables links to be more easily or readily formed, and increasing this value causes the number of links to go down, since it is harder for the modified Jaccard coefficient to exceed the threshold.

Anomaly threshold 1310 is used to specify a threshold against which the ratio of F to C is compared against when identifying or flagging communities which have anomalous evolutionary processes (e.g., at step 108 in FIG. 1). Increasing this value causes the fewer anomalies to be flagged and decreasing this value causes more anomalies to be flagged.

Once the desired parameters have been specified, the user can select button 1312 (i.e., "update anomaly detection") and view the updated aggregated graph snapshots and flagged anomalous communities (e.g., in red).

Providing user interface 1300 enables a user to explore optimal parameters which may best expose anomalies in that particular system or environment. For example, whereas one system or environment may have its anomalies best or optimally exposed using one set of parameters, that same set of parameters may be a poor choice to expose anomalies in another system (e.g., because too many anomalous communities are flagged, or because no anomalous communities are identified at all).

Figure 14:
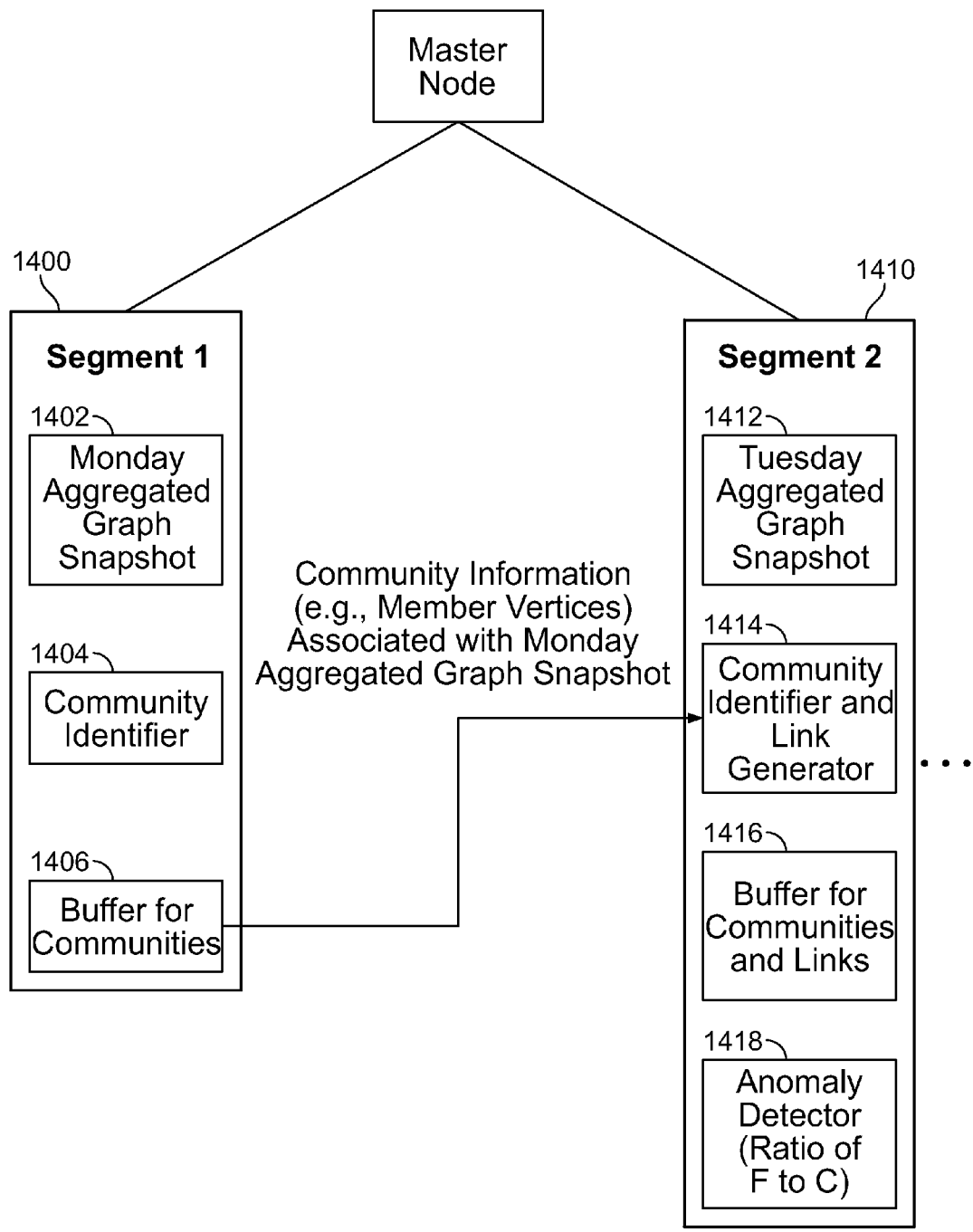
FIG. 14 is a diagram showing an embodiment of a MPP database system which is configured to detect communities which have an anomalous evolutionary process.

FIG. 14 is a diagram showing an embodiment of a MPP database system which is configured to detect communities which have an anomalous evolutionary process. In the example shown, anomalous communities in Tuesday aggregated graph snapshot 1412 are identified. For clarity and brevity, some functions and/or components associated with other anomaly detection processes are not necessarily described herein (e.g., other segments may perform similar processing in order to detect anomalous communities in aggregated graph snapshots associated with other days of the week, but those processes and components are not described herein).

Monday aggregated graph snapshot 1402 on segment 1400 and Tuesday aggregated graph snapshot 1412 on segment 1410 may be generated in any manner, for example according the manner described in FIG. 4. Community identifier and link generator 1414 (as its name implies) is configured to identify communities and generate links between those communities (where appropriate) using Tuesday aggregated graph snapshot 1412. In one example, this is a two-step process where communities are first detected. The detected communities (e.g., including which vertices are included in each of the communities and the edges between those vertices in said communities) are stored in buffer 1416, which is used to store the communities and links.

Community identifier and link generator 1414 may then identify links. In order to do this, it may need to have information about communities in a previous aggregated graph snapshot, for example in order to calculate a modified Jaccard coefficient. This information is obtained from buffer 1406 which is used to store communities within Monday aggregated graph snapshot 1402. For example, community identifier 1404 may have performed community detection on Monday aggregated graph snapshot 1402 and stored the communities (including member vertices) in buffer 1406. For clarity, this is not shown herein but community identifier 1404 may also perform link generator and such links may also be stored in buffer 1406. Returning to the processing performed by community identifier and link generator 1414, calculating a modified Jaccard coefficient may require knowing what vertices are in each community in a previous aggregated graph snapshot and that information is passed from buffer 1406 to community identifier and link generator 1414. Once the modified Jaccard coefficients are calculated, links are assigned or created for those coefficients which are greater than a threshold.

After the communities and links have been generated and stored in buffer 1416, anomaly detector 1418 accesses the stored information in order to detect anomalous communities based on the ratio of F (i.e., the size of a front community) to C (i.e., the size of a current community). In some embodiments, the anomalies may be stored in buffer 1416 if needed (e.g., so that a user interface does not need to run the anomaly detection process again after a shutdown of the anomaly detection user interface and/or can display the anomalous communities immediately after start up).

Detecting anomalies in this manner may be attractive because it mitigates the amount of information that is exchanged between segments. For example, instead of copying (raw) machine generated event log data (e.g., which may be on the order of terabytes) between segments, only the member vertices for communities in a previous aggregated graph snapshot (e.g., vertices in communities which existed on Monday) are sent from segment 1400 to segment 1410. At the community and vertex level, the amount of information has been reduced significantly (e.g., compared to how much memory the (raw) machine generated event log data takes up) and so less information needs to be exchanged or copied between segments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for identifying communities which have an anomaly, comprising:
   receiving machine generated event log data which includes one or more events occurring over a window of time, wherein each event includes one or more events having a first node, a second node, and a timestamp;
   aggregating the events into a plurality of aggregated graph snapshots;
   identifying one or more communities within the plurality of aggregated graph snapshots;
   determining one or more community tracking links between communities in the plurality of aggregated graph snapshots, including by determining a modified Jaccard coefficient $$\left(\frac{A \cap B}{\min(A, B)}\right),$$

where $A \cap B$, is the number of first node or second node in common between community A and community B and min (A, B) is the smaller of the size of community A and the size of community B; and
   using a processor to identify communities in the plurality of aggregated graph snapshot which are anomalous based on one or more of the following: a community level anomaly or an evolutionary path level anomaly.

2. The method of claim 1, wherein the first node includes one or more of the following: a source device, a user, an associated user, or a co-author.

3. The method of claim 1, wherein the second node includes one or more of the following: a destination device, a software application, an associated user, or a co-author.

4. The method of claim 1, wherein aggregating includes using a window function in order to generate smoother aggregated graph snapshots.

5. The method of claim 1, wherein the method is performed by a massively parallel processing (MPP) database system.

6. The method of claim 5, wherein the MPP database system is partitioned so that a first segment included in the MPP database system is configured to generate a first aggregated graph snapshot and a second segment included in the MPP database system is configured to generate a second aggregated graph snapshot.

7. The method of claim 1, wherein identifying one or more communities includes using fast-greedy community detection, including by:
   initially, assigning each first node and each second node to a separate community; and
   merging the two communities that result in a maximal increase in modularity.

8. The method of claim 1 further comprising:
   displaying the communities; and
   indicating, in the display of the communities, which of the displayed communities have an anomalous evolutionary process.

9. The method of claim 8, wherein:
   a first set of communities associated with a first aggregated graph snapshot is arranged in a first column; and
   a second set of communities associated with a second aggregated graph snapshot is arranged in a second column.

10. The method of claim 8 further comprising:
    receiving a selection of at least one of the displayed communities; and
    displaying one or more vertices and one or more edges associated with the selected communities, wherein a first set of vertices associated with a first community in a next aggregated graph snapshot are displayed in a first color and a second set of vertices associated with a second community in a next aggregated graph snapshot are displayed in a second color.

11. The method of claim 8 further comprising:
    receiving a selection of at least one of the displayed communities; and
    displaying one or more of the following characteristics associated with the selected communities: a Jaccard coefficient $$\left(\frac{A \cap B}{A \cup B}\right),$$

a modified Jaccard coefficient $$\left(\frac{A \cap B}{\min(A, B)}\right),$$

a size or a front community, a size of a current community, or a ratio of a size of a front community to a size of a current community.

12. The method of claim 8, wherein displaying includes displaying a two feature scatter plot wherein at least one of the axes includes an axis associated with a ratio of a size of a front community to a size of a current community.

13. The method of claim 8, wherein displaying includes displaying a tuple that includes a timestamp and the size of a community.

14. The method of claim 1 further comprising:

displaying the communities; and indicating, in the display of the communities, which of the displayed communities have a community level anomaly, including an anomaly associated with one or more of the following: a size of a community, a density of a community, a modified Jaccard coefficient, a Jaccard coefficient, a size of a front community, a size of a current community, a ratio of a size of a front community to a size of a current community, a size of a community outgoing edges, or a size of a community incoming edges.

15. A system for identifying communities which have an anomaly, comprising:

a processor; and a memory coupled with the processor, wherein the memory is configured to provide the processor with instructions which when executed cause the processor to:

receive machine generated event log data which includes one or more events occurring over a window of time, wherein each event includes one or more events having a first node, a second node, and a timestamp;

aggregate the events into a plurality of aggregated graph snapshots;

identify one or more communities within the plurality of aggregated graph snapshots;

determine one or more community tracking links between communities in the plurality of aggregated graph snapshots, including by determining a modified Jaccard coefficient $$\left(\frac{A \cap B}{\min(A, B)}\right),$$

where A∩B, is the number of first node or second node in common between community A and community B and min (A, B) is the smaller of the size of community A and the size of community B; and identify communities in the plurality of aggregated graph snapshot which are anomalous based on one or more of the following: a community level anomaly or an evolutionary path level anomaly.

16. The system of claim 15, wherein the instructions for aggregating include instructions for using a window function in order to generate smoother aggregated graph snapshots.

17. The system of claim 15, wherein the instructions for identifying one or more communities include instructions for using fast-greedy community detection, including by:

initially, assigning each first node and each second node to a separate community; and merging the two communities that result in a maximal increase in modularity.

18. The system of claim 15, wherein the memory is further configured to provide the processor with instructions which when executed cause the processor to:

display the communities; and indicate, in the display of the communities, which of the displayed communities have an anomalous evolutionary process.

19. The system of claim 18, wherein the memory is further configured to provide the processor with instructions which when executed cause the processor to:

receive a selection of at least one of the displayed communities; and display one or more vertices and one or more edges associated with the selected communities, wherein a first set of vertices associated with a first community in a next aggregated graph snapshot are displayed in a first color and a second set of vertices associated with a second community in a next aggregated graph snapshot are displayed in a second color.

20. The system of claim 18, wherein the memory is further configured to provide the processor with instructions which when executed cause the processor to:

receive a selection of at least one of the displayed communities; and display one or more of the following characteristics associated with the selected communities: a Jaccard coefficient $$\left(\frac{A \cap B}{A \cup B}\right),$$

a modified Jaccard coefficient $$\left(\frac{A \cap B}{\min(A, B)}\right),$$

a size of a front community, a size of a current community, or a ratio of a size of a front community to a size of a current community.

21. The system of claim 15, wherein the memory is further configured to provide the processor with instructions which when executed cause the processor to:

display the communities; and indicate, in the display of the communities, which of the displayed communities have a community level anomaly, including an anomaly associated with one or more of the following: a size of a community, a density of a community, a modified Jaccard coefficient, a Jaccard coefficient, a size of a front community, a size of a current community, a ratio of a size of a front community to a size of a current community, a size of a community outgoing edges, or a size of a community incoming edges.

22. The system of claim 15, wherein the system includes a massively parallel processing (MPP) database system.

23. The system of claim 22, wherein the MPP database system is partitioned so that a first segment included in the MPP database system is configured to generate a first aggregated graph snapshot and a second segment included in the MPP database system is configured to generate a second aggregated graph snapshot.

24. A computer program product for identifying communities which have an anomaly, the computer program product being embodied in a non-transitory computer readable storage medium and comprising computer instructions for:
- receiving machine generated event log data which includes one or more events occurring over a window of time, wherein each event includes one or more events having a first node, a second node, and a timestamp;
- aggregating the events into a plurality of aggregated graph snapshots;
- identifying one or more communities within the plurality of aggregated graph snapshots;
- determining one or more community tracking links between communities in the plurality of aggregated graph snapshots, including by determining a modified Jaccard coefficient $$\left(\frac{A \cap B}{\min(A, B)}\right),$$

where $A \cap B$, is the number of first node or second node in common between community A and community B and min (A, B) is the smaller of the size of community A and the size of community B; and
- identifying communities in the plurality of aggregated graph snapshot which are anomalous based on one or more of the following: a community level anomaly or an evolutionary path level anomaly.

\* \* \* \* \*